US006958025B2

(12) United States Patent  
Huddleston (10) Patent No.: US 6,958,025 B2  
(45) Date of Patent: Oct. 25, 2005

(54) BELT TENSIONER FOR USE WITH TORQUE CONVERTER

(75) Inventor: Henry Mike Huddleston, Richmond, IN (US)

(73) Assignee: Hoffco/Comet Industries, Inc., Richmond, IN (US)

( * ) Notice: Subject to any disclaimer, the term of this patent is extended or adjusted under 35 U.S.C. 154(b) by 254 days.

(21) Appl. No.: 10/346,743

(22) Filed: Jan. 17, 2003

(65) Prior Publication Data

US 2004/0142781 A1 Jul. 22, 2004

(51) Int. Cl.[7] .................................................. F16H 55/52
(52) U.S. Cl. ............................................. 474/19; 474/8
(58) Field of Search ................................. 474/8, 10, 11, 474/17, 19

(56) References Cited

U.S. PATENT DOCUMENTS

| | | | |
|---|---|---|---|
| 2,155,351 A | 4/1939 | Paulus | |
| 2,612,054 A | 9/1952 | Davis | |
| 2,928,286 A | 3/1960 | Davis | |
| 2,987,934 A | 6/1961 | Thomas | |
| 3,103,999 A | 9/1963 | Rabinow | |
| 3,545,580 A | 12/1970 | Baer | |
| 3,625,079 A | 12/1971 | Hoff | |
| 3,747,721 A | 7/1973 | Hoff | |
| 3,824,867 A | 7/1974 | Brooks | |
| 3,850,050 A | 11/1974 | Lemmens | |
| 3,888,130 A | * 6/1975 | Blanchette | .................... 474/12 |
| 4,179,946 A | 12/1979 | Kanstoroom | |
| 4,196,641 A | 4/1980 | Vogel | |
| 4,380,444 A | 4/1983 | Dolza | |
| 4,575,363 A | 3/1986 | Burgess et al. | |
| 4,585,429 A | 4/1986 | Burgess et al. | |
| 4,969,856 A | 11/1990 | Miyata | |
| 5,254,041 A | 10/1993 | Duclo | |
| RE35,617 E | 9/1997 | Krivec | |
| 5,720,681 A | 2/1998 | Benson | |
| 5,967,286 A | 10/1999 | Hokanson | |
| 6,120,399 A | 9/2000 | Okeson et al. | |
| 6,149,540 A | 11/2000 | Johnson et al. | |
| 6,155,940 A | 12/2000 | Templeton | |
| 6,186,915 B1 | 2/2001 | Dietl | |
| 6,248,035 B1 | 6/2001 | Bartlett | |
| 6,336,878 B1 | 1/2002 | Ehrlich et al. | |
| 6,342,024 B1 | 1/2002 | Walter et al. | |
| 6,354,419 B1 | 3/2002 | Dalbiez | |
| 6,379,274 B1 | * 4/2002 | Robert | .................... 474/19 |
| 6,413,178 B1 | * 7/2002 | Chamberland | ............... 474/19 |
| 6,502,479 B1 | 1/2003 | Lee | |
| 6,743,129 B1 | * 6/2004 | Younggren et al. | ........... 474/19 |
| 2001/0049312 A1 | 12/2001 | Warner et al. | |
| 2002/0019280 A1 | 2/2002 | Brown | |
| 2002/0032088 A1 | 3/2002 | Korenjak et al. | |
| 2002/0065156 A1 | 5/2002 | Younggren | |
| 2002/0119846 A1 | 8/2002 | Kitai et al. | |
| 2002/0160867 A1 | 10/2002 | Katou | |
| 2004/0112707 A1 | * 6/2004 | Watt | .................... 192/93 A |

OTHER PUBLICATIONS

Duane Watt, "Found, The Missing Half of the Secondary Clutch", SnowTech, Sep. 1997, pp 114–119.
Three images of belt tensioner (before Jan. 17, 2003).
Micro Platics, Inc. Fasteners (10 pages) (Dec. 19, 2001).

* cited by examiner

Primary Examiner—Marcus Charles
Assistant Examiner—Vicky A. Johnson
(74) Attorney, Agent, or Firm—Barnes & Thornburg LLP (57) ABSTRACT

A belt tensioner for use with a torque converter to adjust the overall speed of a vehicle is disclosed. The belt tensioner includes motion transmitting fixed unit configured to be fixed to a vehicle output shaft for movement therewith and a belt tensioning movable unit configured for movement relative to the fixed unit. The fixed unit includes a cam and the movable unit includes a cam follower and a rotation limiter. The cam follower is configured to follow the cam to tension a belt located between flanges of the fixed and movable units. The rotation limiter is configured to engage the cam to limit relative rotation between the cam and the cam follower away from one another.

20 Claims, 11 Drawing Sheets

United States Patent US 6,958,025 B2

BELT TENSIONER FOR USE WITH TORQUE CONVERTER

BACKGROUND

The present disclosure relates to torque converters and more particularly to belt tensioners for tensioning belts of torque converters.

Torque converters are used on vehicles to adjust the overall speed thereof. A torque converter on a vehicle is responsive to both engine speed and torque encountered by a wheel of the vehicle. The torque converter operates to convert increased engine speed into an increased rotational rate of the wheel and to convert decrease engine speed into a decreased wheel rotational rate. If the wheel encounters increased torque or rotational resistance, the torque converter causes the engine to reduce its speed.

Some torque converters use a belt trained about components of the torque converter. In such cases, a belt tensioner may be used to tension the belt to promote the responsiveness of the torque converter to engine speed and wheel torque.

SUMMARY

According to the present disclosure, a belt tensioner is disclosed for use with a torque converter to adjust the overall speed of a vehicle having a wheel and an output shaft coupled to the wheel. The belt tensioner includes flanges that cooperate to provide a space therebetween to receive a belt of the torque converter for transmission of motion between the belt and the output shaft. The belt tensioner includes a cam and a cam follower normally biased against the cam to follow the cam to tension the belt upon axial movement of the flanges away from one another.

A rotation limiter is configured to engage the cam to limit relative rotation between the cam and the cam follower away from one another. Such relative rotation away from one another may occur, for example, when the vehicle lands on the ground after having gone airborne. Impact of the vehicle wheel with the ground may suddenly increase the rotational rate of the wheel thereby jolting the cam away from the cam follower and into engagement with the rotation limiter. The cam extends between the cam follower and the rotation limiter to minimize the distance that the cam travels from the cam follower to the rotation limiter to minimize the force of the impact between the cam and the rotation limiter.

According to an aspect of the disclosure, the cam follower and the rotation limiter are coupled to the same axially extending mount. The mount is coupled to a hub through which the output shaft is to extend. The mount is removable from the hub to facilitate replacement of the cam follower and the rotation limiter.

Additional features and advantages of the apparatus will become apparent to those skilled in the art upon consideration of the following detailed description exemplifying the best mode as presently perceived.

BRIEF DESCRIPTION OF THE DRAWINGS

The detailed description particularly refers to the accompanying figures in which.

DETAILED DESCRIPTION OF DRAWINGS

Figure 1:
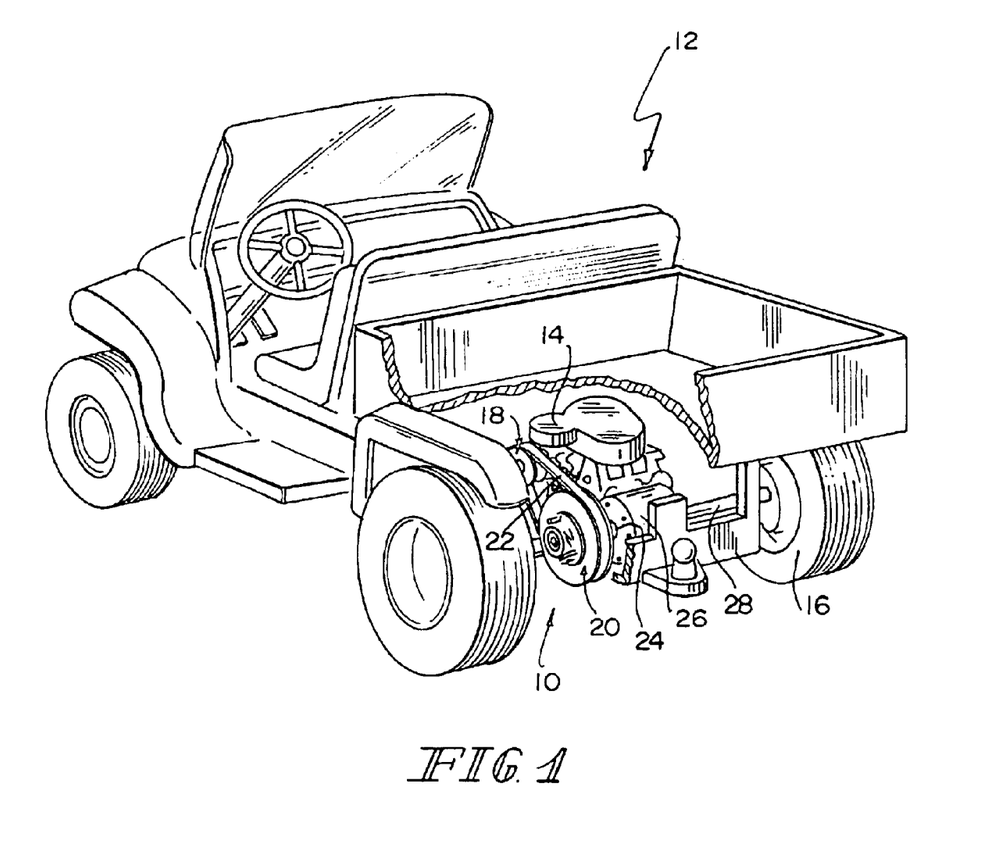
FIG. 1 is a perspective view of a vehicle, with portions broken away, showing the vehicle including a torque converter for adjusting the overall speed of the vehicle in response to the speed of the vehicle engine and torque or rotational resistance experienced by the right rear wheel.
Figure 2:
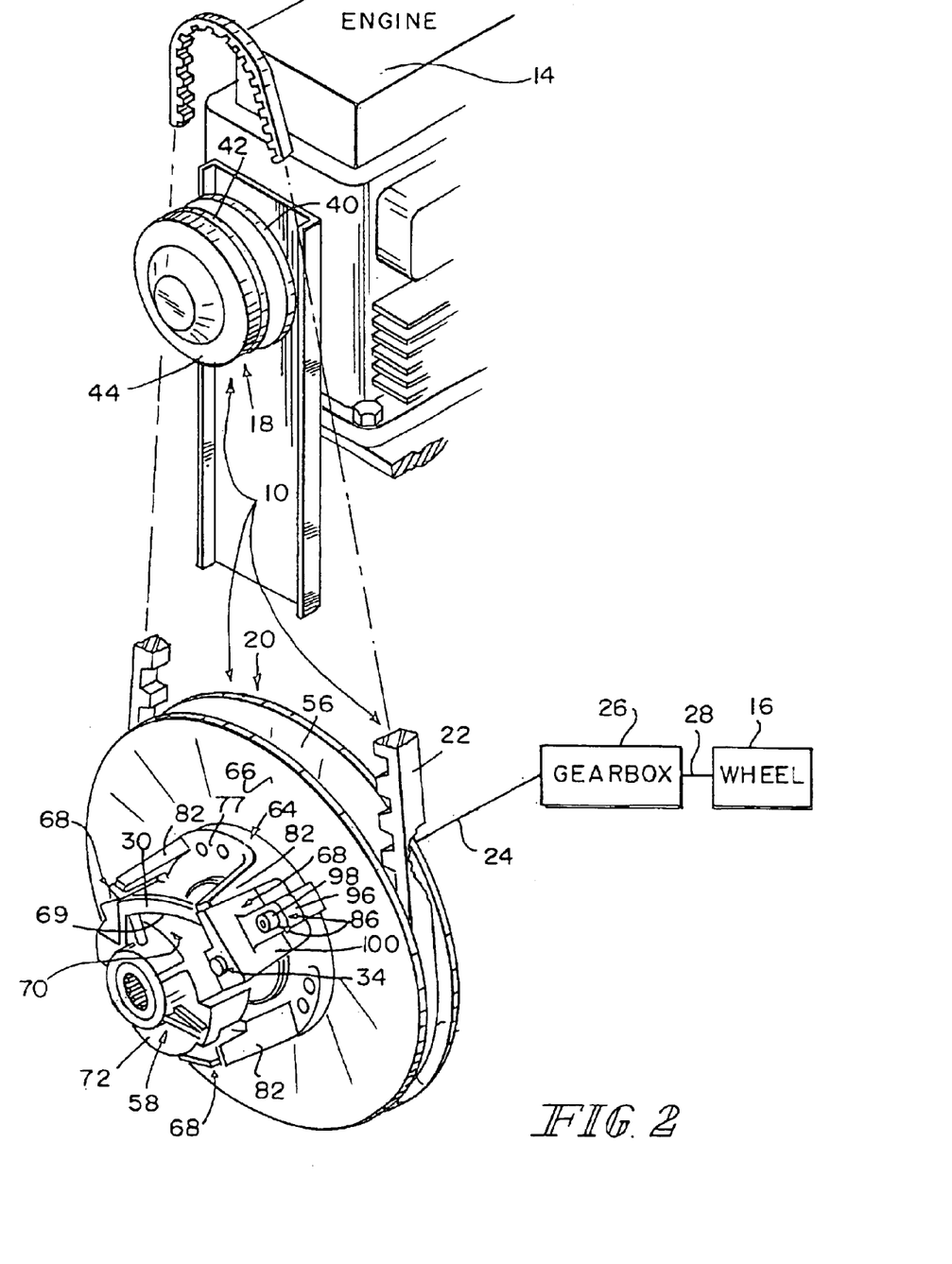
FIG. 2 is a perspective view showing the torque converter including a belt trained about a driver (at top of page) for rotating the belt and a belt tensioner (at bottom of page) for tensioning the belt to promote engine speed and torque responsiveness of the torque converter.

A torque converter 10 for adjusting the overall speed of a vehicle 12 (e.g., utility vehicle, all-terrain vehicle, motorcycle, mini-bike) is shown in FIGS. 1 and 2. Torque converter 10 is coupled to vehicle engine 14 and a vehicle wheel 16 so that it is responsive to both the speed of engine 14 and torque or rotational resistance encountered by wheel 16. Concerning engine speed responsiveness, torque converter 10 is operable to convert increased engine speed into an increased rotational rate of wheel 16 and to convert decreased engine speed into a decreased wheel rotational rate. Regarding torque responsiveness, torque converter 10 is operable to reduce the speed of engine 14 when wheel 16 encounters increased torque.

Torque converter 10 includes a driver 18, a belt tensioner 20, and a belt 22 trained about driver 18 and belt tensioner 20, as shown in FIGS. 1 and 2. Driver 18 is coupled to engine 14. Belt tensioner 20 is coupled to an output shaft 24 for transmission of motion between belt 22 and output shaft 24. Output shaft 24 operates a gearbox 26 that turns an axle 28 associated with wheel 16.

Belt tensioner 20 is configured to tension belt 22 to promote responsiveness of torque converter 10. In particular, belt tensioner 20 has a system of cams 30 and cam followers 32 normally biased into engagement with cams 30 to follow cams 30 to tension belt 22, as suggested in FIGS. 3 and 5–11.

Figure 12:
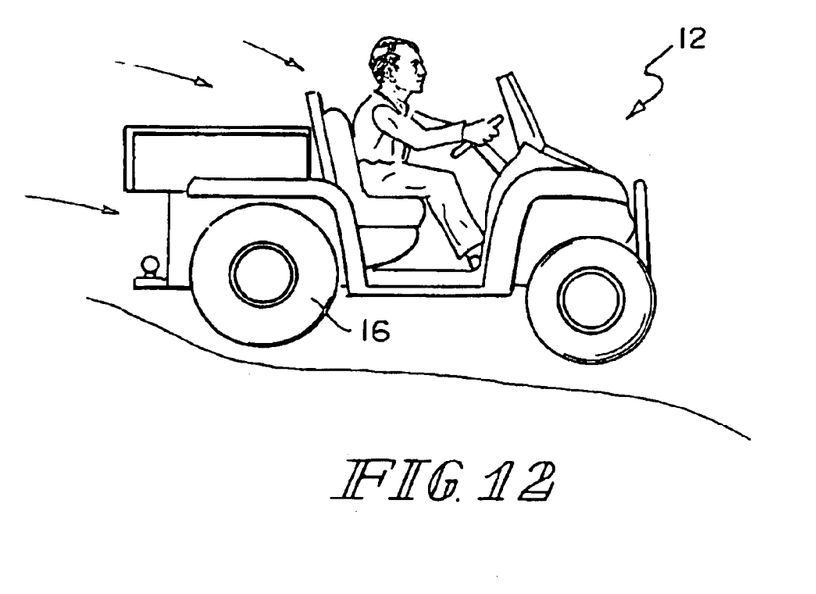
FIG. 12 is an elevation view showing the vehicle having gone airborne.

There are times, however, when cam followers 32 may disengage cams 30. This may occur, for example, when vehicle 12 lands on the ground after having gone airborne, as suggested in FIGS. 12 and 13. Impact of wheel 16 with the ground may suddenly increase the rotational rate of wheel 16 thereby jolting cams 30 away from cam followers 32 and into engagement with a system of rotation limiters 34, as suggested in FIGS. 14–16. Rotation limiters 34 thus limit relative rotation between cams 30 and the cam followers 32 away from one another. Cams 30, cam followers 32, and rotation limiters 34 are positioned relative to one another to limit the force of the impact of cams 30 against rotation limiters 34, as discussed in more detail herein. Further, cam followers 32 and rotation limiters 34 are mounted in a manner so as to facilitate their replacement, as suggested in FIG. 3 and also discussed in more detail herein.

Figure 6:
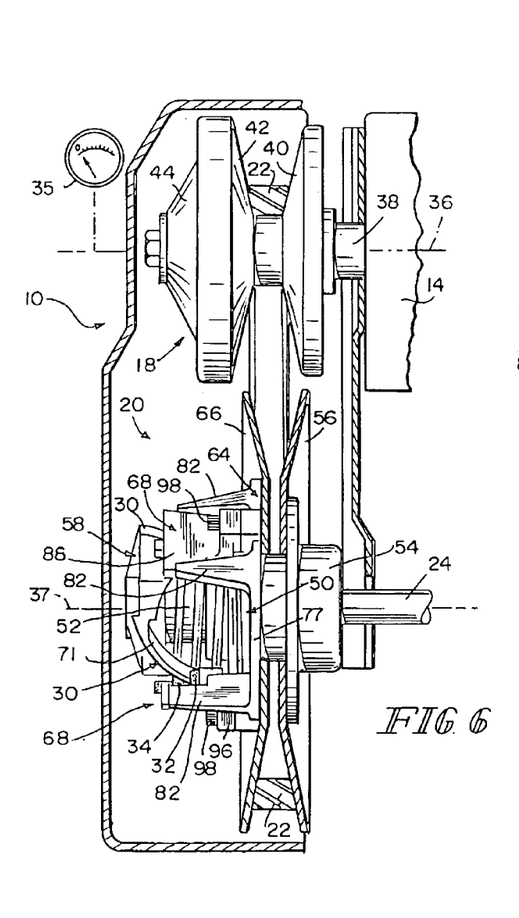
FIG. 6 is an elevation view showing the torque converter when the engine is idling or shut down so that the belt is at a radially inner location on the driver between relatively movable flanges thereof and the belt is at a radially outer location on the belt tensioner between relatively movable flanges thereof.
Figure 9:
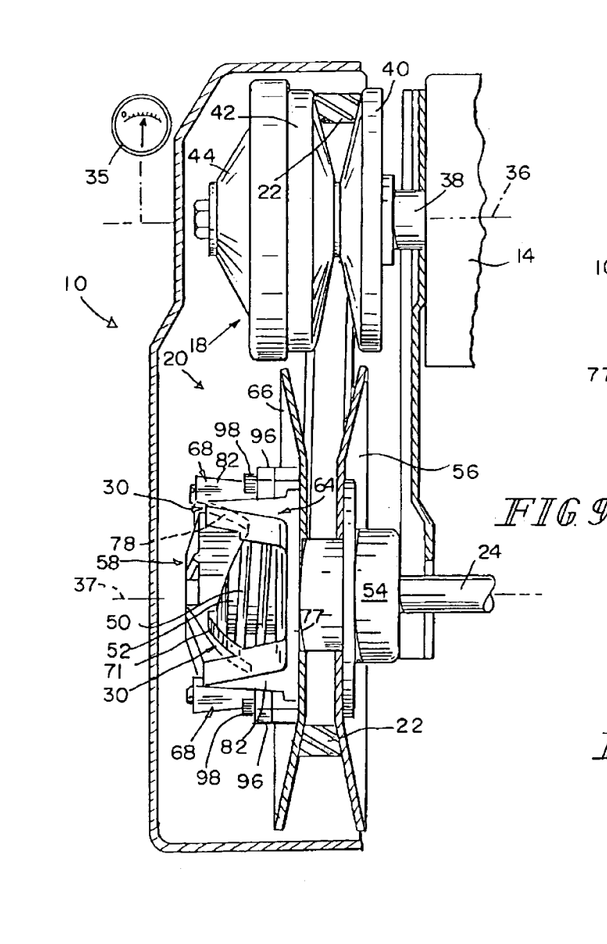
FIG. 9 is an elevation view of the torque converter when the engine is at an operational speed so as to cause the belt to move radially outwardly on the driver and radially inwardly on the belt tensioner which, in turn, causes the left flange of the belt tensioner to move axially outwardly to the left away from the right flange of the belt tensioner.
Figure 14:
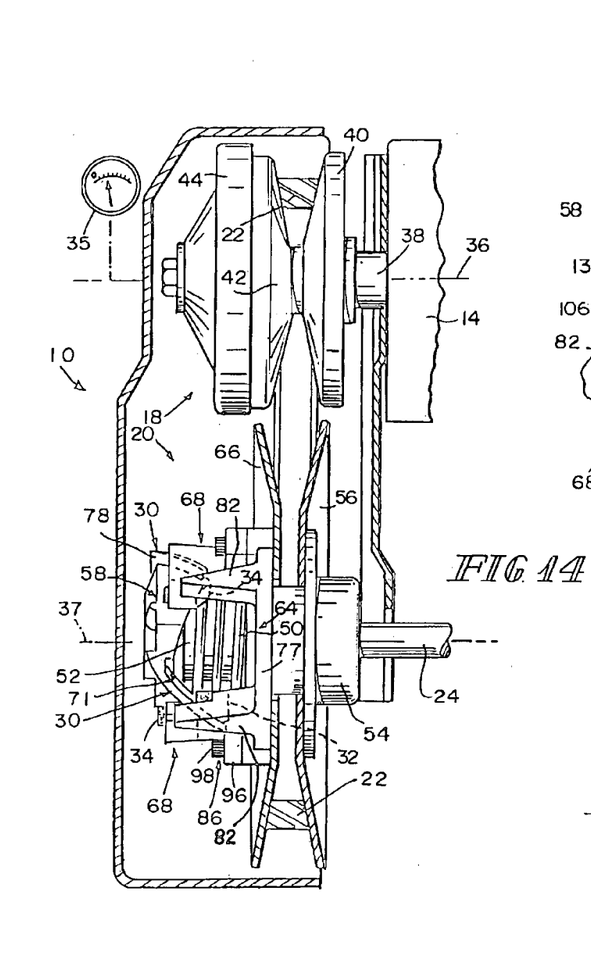
FIG. 14 is an elevation view showing the torque converter when the vehicle impacts the ground as in the situation shown in FIG. 13.

Driver 18 and belt tensioner 20 operate as adjustable pulleys. As such, they allow belt 22 to move radially inwardly and outwardly thereon in response to engine speed and wheel torque. For example, belt 22 is positioned radially inwardly on driver 18 and radially outwardly on belt tensioner 20 at engine idle or stoppage, as suggested in FIG. 6. As engine 14 increases its speed, belt 22 moves radially outwardly on driver 18 and radially inwardly on belt tensioner 20 to increase the rotational rate of wheel 16, as suggested in FIG. 9. As engine 14 slows down or as the wheel experiences rotational resistance, belt 22 moves to intermediate locations on driver 18 and belt tensioner 20, as suggested in FIG. 14. A speedometer 35 is shown in FIGS. 6, 9, and 14 to indicate the speed of the engine 14 during the situations illustrated therein. It should be appreciated that directional terms used herein, such as "radial," "radially," "axial," circumferential," "rotate," "rotation," "rotational" and the like, are relative to a driver axis 36 when used in the context of the driver and are relative to a tensioner axis 37 when used in the context of belt tensioner 20.

Driver 18 is coupled to a shaft 38 that interconnects driver 18 and engine 14, as shown in FIGS. 6, 9, and 14. Driver 18 includes a fixed flange 40 fixed to shaft 38 for movement therewith and a movable flange 42 configured to move relative to fixed flange 40. A flange adjustment mechanism 44 of driver 18 is configured to move movable flange 42 toward fixed flange 40 as the speed of engine 14 increases to "push" belt 22 radially outwardly on driver 18. When the engine speed slows down or the wheel 16 experiences rotational resistance, belt tensioner 20 "pulls" the belt 22 radially inwardly on driver 18 thereby moving movable flange 42 away from fixed flange 40. An exemplary driver that may be used as driver 18 is disclosed in U.S. Pat. No. 6,155,940, the disclosure of which is hereby incorporated by reference herein.

Figure 4:
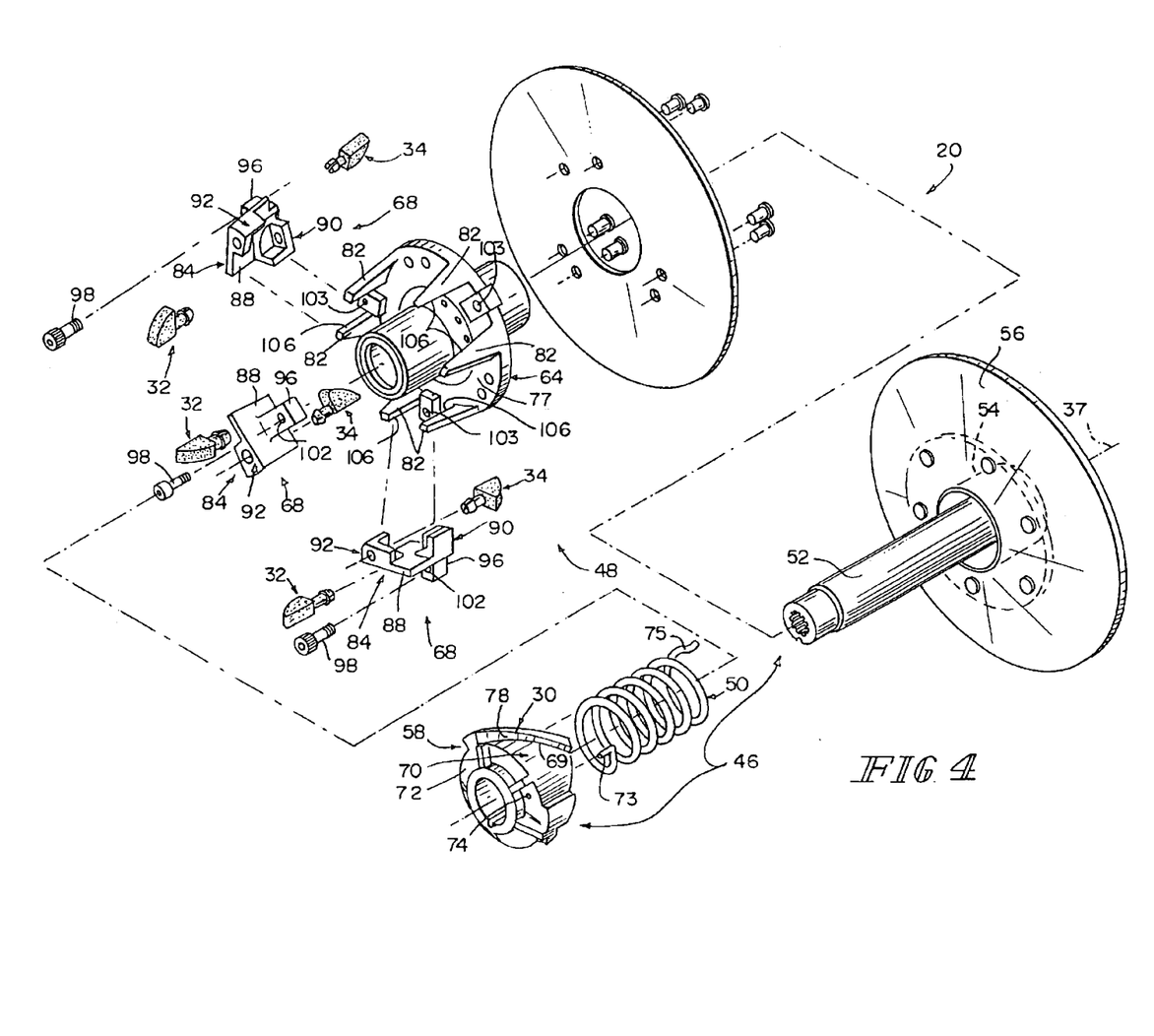
FIG. 4 is an exploded perspective view of the belt tensioner.

Belt tensioner 20 includes a motion transmitting fixed unit 46 for transmitting motion between belt 22 and output shaft 24 and a belt tensioning movable unit 48 for tensioning belt 22, as suggested in FIG. 4. Fixed unit 46 is fixed to output shaft 24 for movement therewith. Movable unit 48 is configured to move relative to fixed unit 46. A torsion spring 50 is positioned between and in engagement with fixed and movable units 46, 48 for reasons discussed in more detail herein. Components of fixed and movable units 46, 48 are now discussed.

Figure 5:
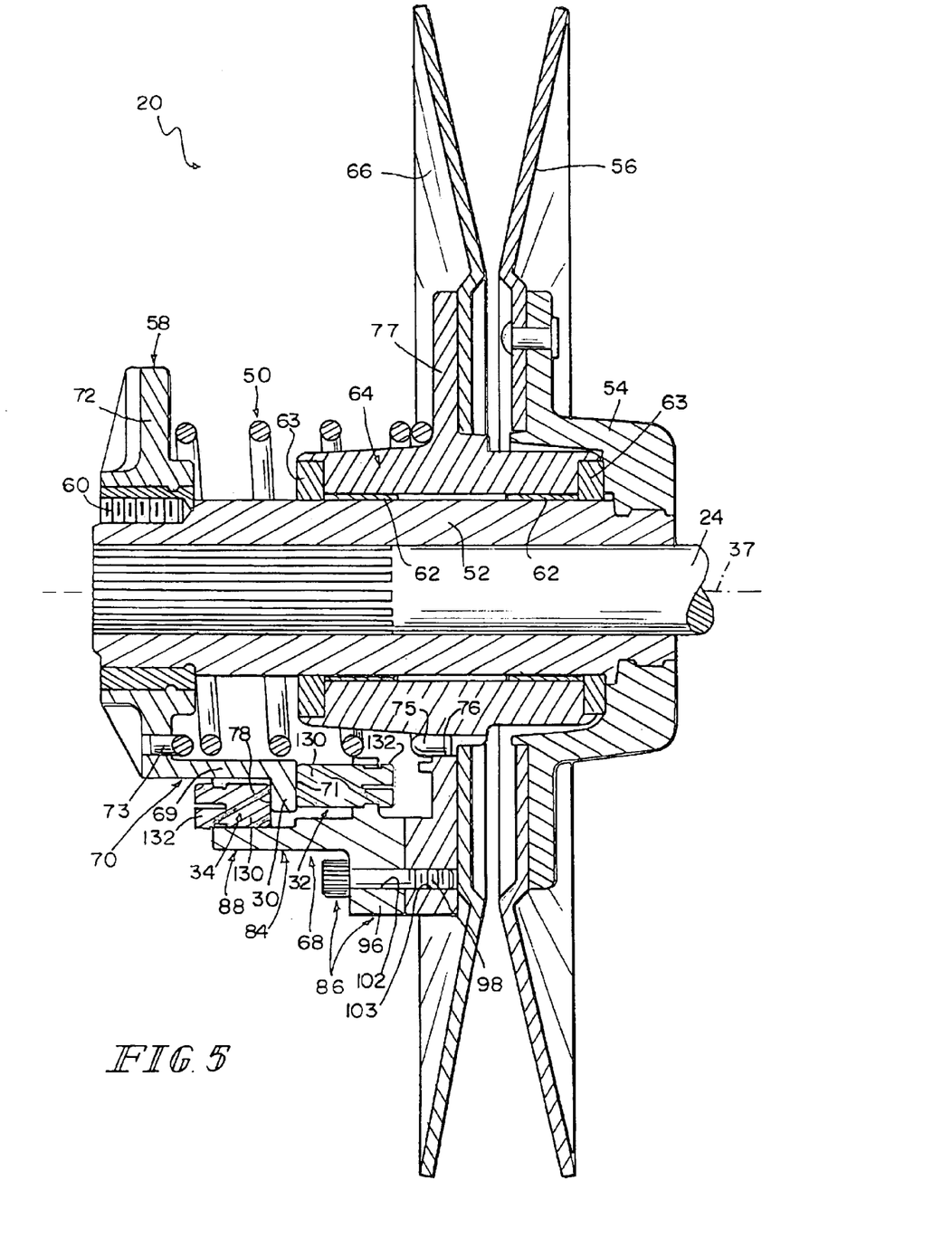
FIG. 5 is a sectional view taken along lines 5—5 of FIG. 3.

Fixed unit 46 includes a sleeve 52, an annular fixed hub 54, an annular fixed flange 56, and a flange rotator 58 for rotating a flange of movable unit 48, as shown in FIGS. 4 and 5. Output shaft 24 extends through sleeve 52 which is keyed or otherwise fixed thereto for rotation therewith. Sleeve 52 extends through hub 54 which is fixed to a first end of sleeve 52 for rotation therewith. The flange 56 is, in turn, fixed to hub 54 for rotation with hub 54. An annular base 72 of flange rotator 58 is fixed to a second end of sleeve 52 by a set screw 60 for rotation of flange rotation 58 with sleeve 52. The components of fixed unit 46 are therefore configured to move together with output shaft 24.

Flange rotator 58 includes cams 30, as shown in FIGS. 2–7, 9, 10, 14, 15, and 17. Cams 30 are structurally and functionally similar to one another so that the discussion of only one cam 30 applies to the other cams 30 as well. Cam 30 is helical in that it extends circumferentially and axially in its longitudinal dimension. In its narrower lateral dimension, cam 30 extends radially outwardly from an axially and circumferentially extending edge portion 69 of an associated cam mount 70. Cam 30 includes a cam follower surface 71 for engaging an associated cam follower 32 and a rotation limiter surface 78 for engaging an associated rotation limiter 34. Cam follower and rotation limiter surfaces 71, 78 are positioned in parallel relation and face in axially and circumferentially opposite directions. In particular, cam follower surface 71 faces axially inwardly and rotation limiter surface 78 faces axially outwardly.

Each cam mount 70 extends axially inwardly from a radially outer edge portion of the base 72 of flange rotator 58, as shown in FIGS. 2–7, 9, 10, 14, 15, and 17. There are, for example, three cam mounts 70, one for each cam 30. Cam mounts 70 are spaced circumferentially evenly from one another so that cams 30 are spaced circumferentially evenly from one another. Each cam mount 70 has a somewhat triangular configuration.

Movable unit 48 includes a pair of bearings 62, a pair of seals 63, a movable hub 64, a movable flange 66 to be rotated by flange rotator 58, and a number of engagement units 68 which include cam followers 32 and rotation limiters 34, as shown in FIGS. 4 and 5. Hub 64, flange 66, and the engagement units 68 are mounted for movement with one another and relative to fixed unit 46. The bearings 62 are mounted on sleeve 52 to slide axially thereon. Movable hub 64 circumferentially surrounds sleeve 52 and is mounted on bearings 62 for axial and rotational movement relative to fixed unit 46. Flange 66 also circumferentially surrounds sleeve 52 and is fixed to movable hub 64 for movement therewith and thus for axial and rotational movement relative to fixed unit 46. Fixed and movable flanges 56, 66 cooperate to provide a space therebetween to receive belt 22 for transmission of motion between belt 22 and output shaft 24.

Engagement units 68 are coupled to a radially outer portion of an annular base 77 of movable hub 64, as shown in FIGS. 2–5. There are, for example, three engagement units 68 spaced about 120° apart from one another. Each of engagement units 68 is associated with one of cams 30. Engagement units 68 are structurally and functionally similar to one another so that the description of the one applies to the others as well.

Figure 3:
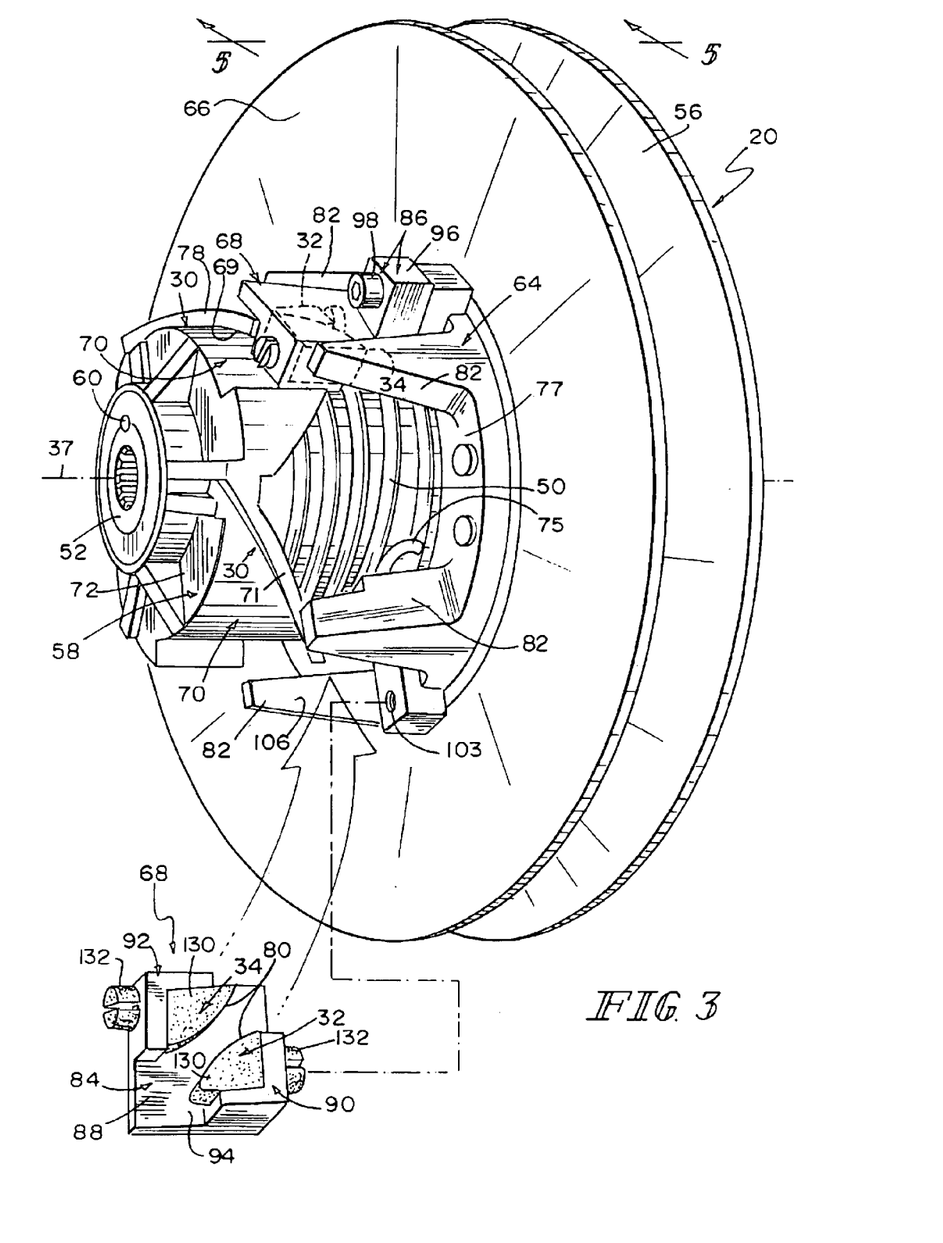
FIG. 3 is a perspective view showing the belt tensioner including a removable engagement unit that is to be coupled to the belt tensioner and includes a cam follower (shown in the lower right corner of the engagement unit) and a rotation limiter (shown in the upper left corner of the engagement unit)
Figure 18:
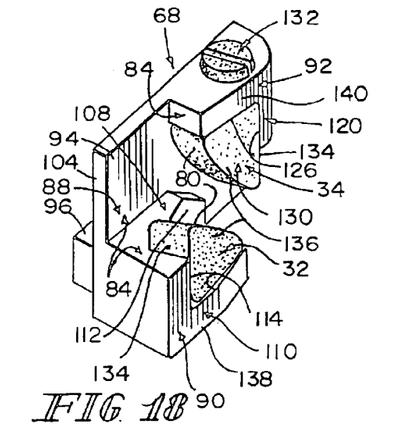
FIG. 18 is a perspective view of an engagement unit of the belt tensioner including a cam follower, a rotation limiter, and a mount holding the cam follower and rotation limiter.
Figure 19:
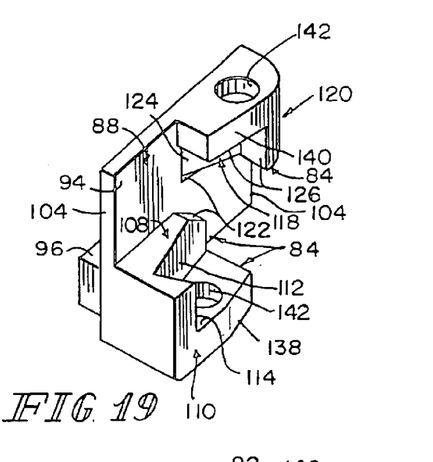
FIG. 19 is a perspective view of the mount of the engagement unit of FIG. 18.

Engagement unit 68 includes one of cam followers 32, one of rotation limiters 34, and a common mount 76 that supports cam follower 32 and rotation limiter 34 and is removably coupled to base 77, as shown in FIGS. 3 and 18. Each of cam follower 32 and rotation limiter 34 includes a "slippery" engagement surface 80. To provide this slippery surface, among other characteristics, cam follower 32 and rotation limiter 34 are made of, for example, a fluoropolymer such as tetrafluoroethylene, or TEFLON®. Engagement surface 80 of cam follower 32 is configured to engage and follow cam follower surface 71 of the associated cam 30. Engagement surface 80 of rotation limiter 34 is configured to engage rotation limiter 78 of associated cam 30 when, for example, fixed unit 46 is "jolted" to rotate relative to movable unit 48, as explained in more detail herein.

Cam 30 extends between cam follower 32 and rotation limiter 34 such that cam follower 32 and rotation limiter 34 "straddle" cam 30, as shown in FIGS. 5, 7, 8, 10, 11, 15, and 16. This allows rotation limiter 34 to be positioned relatively "close" to rotation limiter surface 78 to minimize the impact force between rotation limiter 34 and the rotation limiter surface 78. For example, rotation limiter 34 is normally spaced apart from rotation limiter surface 78 by a distance of about 0.19 inch or less. In this arrangement in which cam 30 extends between cam follower 32 and rotation limiter 34, cam follower 32 and rotation limiter 34 are oriented so that their engagement surfaces 80 face one another. In addition, rotation limiter 34 is positioned "ahead" of cam follower 32 and cam 30, as discussed in more detail herein.

Mount 76 is coupled to and extends axially outwardly from base 77 of movable hub 64, as shown in FIGS. 5–7, 9, 10, 14, and 15. Mount 76 is removable from base 77 to facilitate replacement of cam follower 32 and/or rotation limiter 34. Mount 76 is wedged between a pair of circumferentially spaced-apart posts 82 to secure engagement unit 68 in place. There are, for example, six posts 82, two for each engagement unit 68, and posts 82 extends axially outwardly from the radially outer portion of the base 77.

Figure 25:
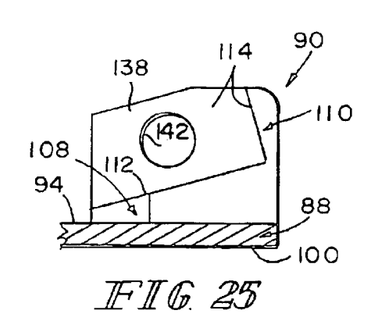
FIG. 25 is a sectional view taken along lines 25—25 of FIG. 20 showing a cam follower retainer for retaining the cam follower on the mount.
Figure 26:
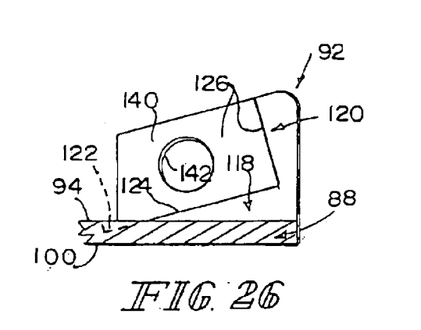
FIG. 26 is a sectional view taken along lines 26—26 of FIG. 20 showing a rotation limiter retainer for retaining the rotation limiter on the mount.

Mount 76 includes a support 84 to which cam follower 32 and rotation limiter 34 are coupled and a coupler 86 for removably coupling support 84 to base 77, as shown in FIGS. 3, 5, and 18–21. Support 84 includes a generally planar, axially extending support wall 88, a cam follower retainer 90 (see FIG. 25) to which cam follower 32 is coupled, and a rotation limiter retainer 92 (see FIG. 26) to which rotation limiter 34 is coupled. Retainers 90, 92 are fixed to and extend radially inwardly from a radially inner surface 94 of support wall 88.

Figure 20:
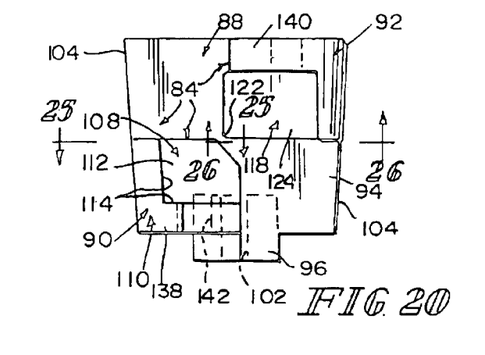
FIG. 20 is a front elevation view of the mount of the engagement unit of FIG. 19.
Figure 21:
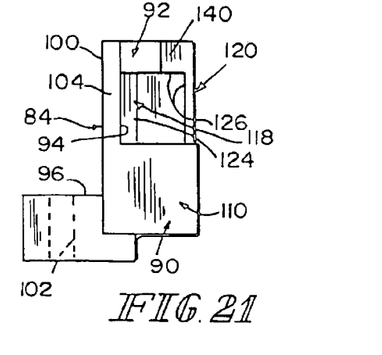
FIG. 21 is a side elevation view of the mount of the engagement unit of FIG. 19.
Figure 22:
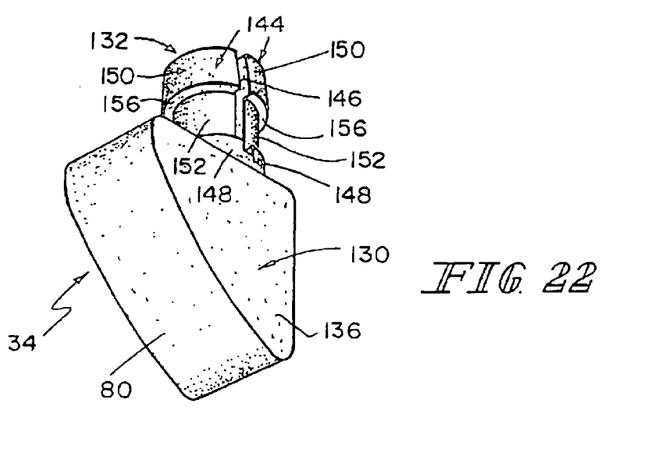
FIG. 22 is a perspective view representative of each of the cam follower and the rotation limiter.

Support wall 88 includes tapered edges 104, as shown in FIG. 20. The edges 104 taper toward one another as they extend axially inwardly to engage and wedge against tapered surfaces 106 (see FIGS. 7, 10, and 15) of posts 82. The post tapered surfaces 106 also taper toward one another as they extend axially inwardly. Tapered edges 104 wedge against tapered surfaces 106 to provide a snug fit therebetween.

Cam follower retainer 90 includes a ramp 108 and a generally L-shaped wall 110, as shown in FIGS. 18–21. Ramp 108 is fixed to and extends radially inwardly from inner surface 94. L-shaped wall 110 is fixed to and extends radially inwardly from ramp 108. Ramp 108 includes an inclined surface 112 spaced apart from and inclined relative to the inner surface 94. What is meant herein by the term "inclined" is neither parallel nor perpendicular. L-shaped wall 110 includes a pair of surfaces 114 that are perpendicular to inclined surface 112.

Rotation limiter retainer 92 includes a ramp 118 and a generally L-shaped wall 120, as shown in FIGS. 18–21. Ramp 118 is fixed to and extends radially inwardly from inner surface 94. It also extends into a recess 122 formed in inner surface 94. L-shaped wall 120 is fixed to and extends radially inwardly from ramp 118. Ramp 118 includes an inclined surface 124 that is inclined relative to inner surface 94. L-shaped wall 120 includes a pair of surfaces 126 that are perpendicular to inclined surface 124.

Each of cam follower 32 and rotation limiter 34 includes a main body 130 and a connector 132 for connecting body 130 to one of retainers 90, 92, as shown in FIGS. 18 and 22–24. Body 130 is, for example, generally triangular and includes engagement surface 80, a pair of peripheral surfaces 134, and a pair of generally triangular, parallel, radially spaced-apart side surfaces 136. Engagement surface 80 and peripheral surfaces 134 cooperate to provide a closed, generally triangular loop. The radially inner side surface 136 of cam follower 32 engages inclined surface 112 of ramp 108 of cam follower retainer 90. Peripheral surfaces 134 of cam follower 32 engage surfaces 114 of L-shaped wall 110 of cam follower retainer 90. The radially inner side surface 136 of rotation limiter 32 engages inclined surface 124 of ramp 118 of rotation limiter retainer 92. Peripheral surfaces 134 of rotation limiter 34 engage surfaces 126 of L-shaped wall 120 of rotation limiter retainer 92. In this way, surfaces 112, 114, 124, 126 of retainers 90, 92 cooperate to orient cam follower 32 and rotation limiter 34 in a manner accommodating the helical shape of cam 30 so that cam follower 32 will engage and follow helically shaped cam follower surface 71 and rotation limiter 34 will engage helically shaped rotation limiter surface 78.

Figure 8:
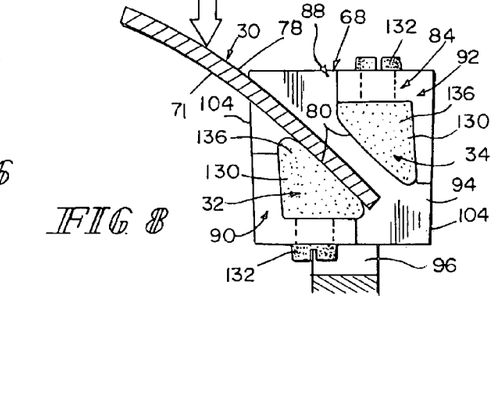
FIG. 8 is a sectional view taken along lines 8—8 of FIG. 7 showing the cam between the cam follower and the rotation limiter, the cam follower engaging the cam at the axially inner location, and the rotation limiter spaced apart from the cam.
Figure 11:
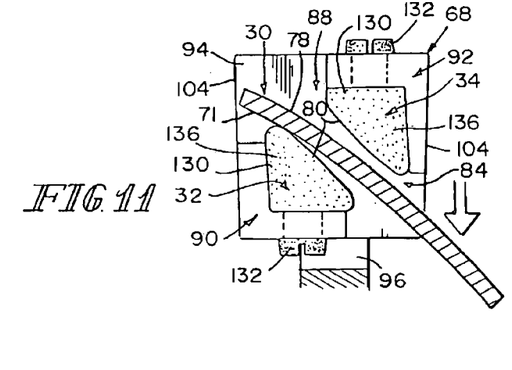
FIG. 11 is a sectional view taken along lines 11—11 of FIG. 10 showing the cam follower engaging the cam at the axially outer location and the rotation limiter spaced apart from the cam.
Figure 16:
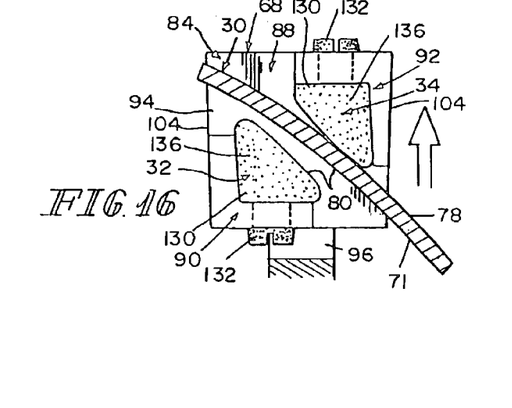
FIG. 16 is a sectional view taken along lines 16—16 of FIG. 15 showing the cam follower spaced apart from the cam and the rotation limiter engaging the cam.
Figure 17:
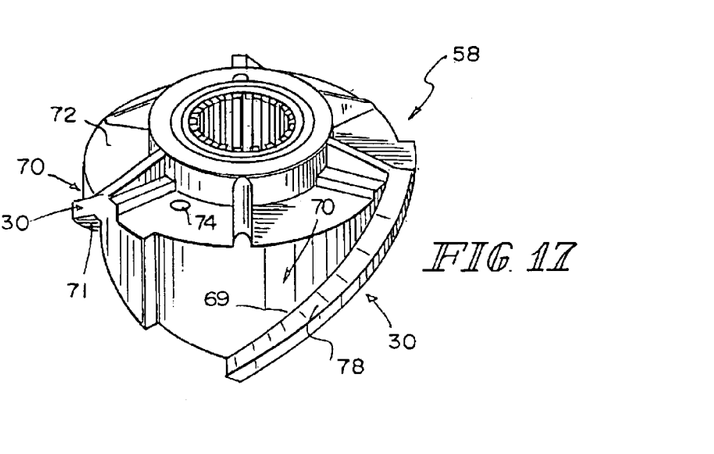
FIG. 17 is a perspective view showing a flange rotator of the belt tensioner including cams extending radially outwardly from cam mounts.

Connectors 132 of cam follower 32 and rotation limiter 34 are coupled to L-shaped walls 110, 120 of retainers 90, 92, as shown in FIGS. 8, 11 and 16. In particular, connector 132 of cam follower 32 is coupled to an axially inner portion 138 of L-shaped wall 110 and connector 132 of rotation limiter 34 is coupled to an axially outer portion 140 of L-shaped wall 120. Since connectors 132 are coupled to portions 138, 140 in a similar manner, the following discussion of how the rotation limiter connector 132 is coupled to portion 140 applies also to how cam follower connector 132 is coupled to portion 138.

Figure 23:
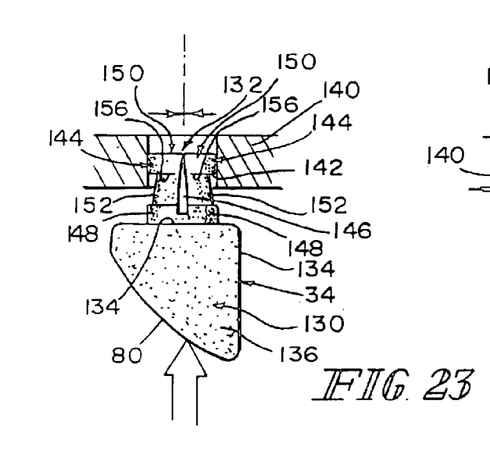
FIG. 23 is an elevation view showing a connector of the representative cam follower/rotation limiter of FIG. 22 being inserted through a channel formed in a wall (shown in section) of the mount thereby causing flexible members of the connector to flex toward one another.
Figure 24:
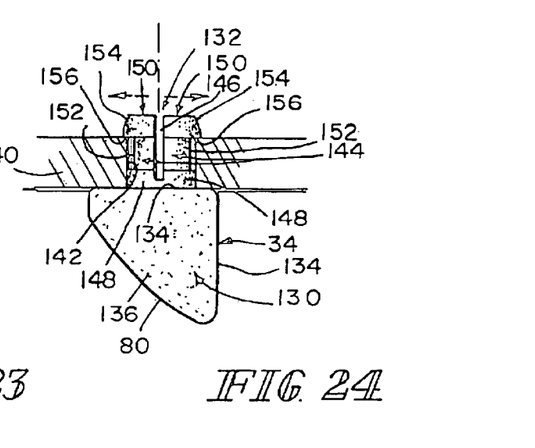
FIG. 24 is an elevation view showing the connector of the representative cam follower/rotation limiter of FIG. 22 extending all the way through the channel so that the flexible members spring away from one another to couple the representative cam follower/rotation limiter to the mount.

Connector 132 extends through a connector-receiving channel 142 formed in portion 140, as shown in FIGS. 23 and 24. Connector 132 includes a pair of flexible members 144 cantilevered to body 130 for insertion through channel 142. Members 144 members cooperate to provide a slot 146 therebetween to allow members 144 to flex toward one another upon insertion of the members through channel 142.

Each cantilevered flexible member 144 includes a proximal end portion 148 and a distal end portion 150 spaced apart from proximal end portion 148. Proximal end portions 148 are coupled to one of peripheral surfaces 134 of body 130. Proximal and distal end portions 148, 150 cooperate to provide a groove 152 therebetween to promote flexure of member 144 during insertion and removal of connector 132 through and from channel 142. Each distal end portion 150 includes a tapered surface 154 for engagement with channel 142 to facilitate insertion of connector 132. Each distal end portion 150 is positioned outside of channel 142 after insertion therethrough and includes a retainer surface 156 facing back toward body 130 and engaging portion 148 to couple rotation limiter 34 thereto. Distal end portions 150 thus cooperate to provide connector 130 with a barb. To detach connector 130 from portion 148, distal end portions 150 are squeezed toward one another so that retainer surfaces 156 disengage portion 148 to allow connector 130 to be removed from channel 142.

Coupler 86 includes a block 96 and a fastener 98, such as a screw, as shown in FIGS. 2 and 5. Block 96 is fixed to support wall 88 and extends radially outwardly from a radially outer surface 100 of support wall 88. Fastener 98 extends through a first fastener-receiving channel 102 formed in block 96 and extends into a second fastener-receiving channel 103 to couple engagement unit 68 to base 77. The fastener 98 may be detached from base 77 for removal of engagement unit 68 from base 77. Block 96 spaces support wall 88 away from base 77 to provide space for distal end portions 150 of cam follower 32 extending out of channel 142 formed in wall portion 138.

Spring 50 extends between base 72 of flange rotator 58 and base 77 of movable hub 64, as shown in FIG. 5. Spring 50 includes an axially outer end 73 captured in a spring-receiving aperture 74 formed in base 72. An axially inner end 75 of spring 50 is captured in a spring-receiving aperture 76 formed in base 77. Three cam mounts 70 and the three engagement units 68 provide an interior region containing spring 50.

Figure 7:
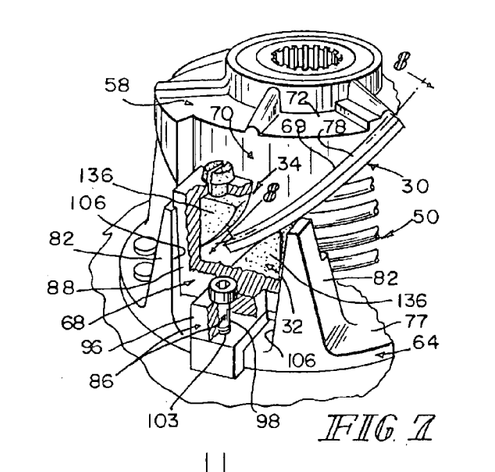
FIG. 7 is a perspective view, with portions broken away, that corresponds to the engine idle/shut down condition of FIG. 6 and shows an engagement unit coupled to the belt tensioner, a helical cam extending between the cam follower and the rotation limiter of the engagement unit, the cam follower engaging the cam at an axially inner location, and the rotation limiter being spaced apart from the cam.

Referring now to FIGS. 6–8, during idle of engine 14 or when engine 14 is shut down, belt 22 is positioned at its radially inner most location on driver 18 and at its radially outermost location on belt tensioner 20. As such, flanges 40, 42 of driver 18 are at their farthest point away from one another and flanges 56, 66 of belt tensioner 20 are at their closest point relative to one another. Further, spring 50 biases cam follower 32 into engagement with cam follower surface 71 at its axially innermost location thereon and rotation limiter 34 is spaced apart from rotation limiter surface 78, as shown in FIGS. 7 and 8.

Figure 10:
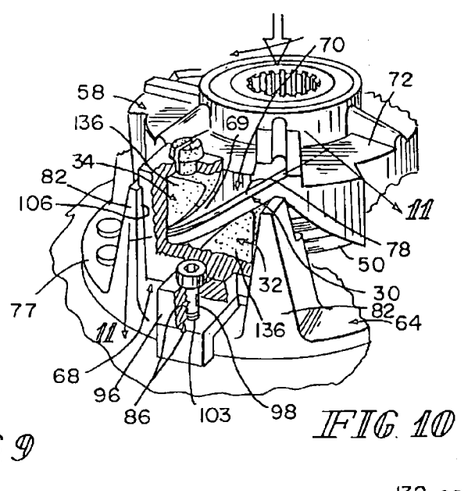
FIG. 10 is a perspective view, with portions broken away, that corresponds to the operational engine condition of FIG. 9 and shows the cam follower having followed the cam to an axially outer location thereon in response to the left flange of the belt tensioner of FIG. 9 moving to the left to cause relative rotation between the left and right flanges of the belt tensioner of FIG. 9 to tension the belt.

Referring now to FIGS. 9–11, as engine 14 picks up speed, adjustment mechanism 44 of driver 18 moves movable flange 42 toward fixed flange 40 thereby causing belt 22 to move radially outwardly on driver 18 and radially inwardly on belt tensioner 22. As belt 22 moves radially inwardly on belt tensioner 20, belt 22 moves movable flange 66 and thus movable unit 48 axially outwardly away from fixed flange 56 against a biasing force from spring 50. This causes cam follower 32 to follow cam follower surface 71 for relative rotation of movable flange 66 and fixed flange 56. In particular, cam follower 32 travels axially outwardly in a "reverse" circumferential direction relative to cam follower surface 71 thereby causing movable flange 66 to rotate relative to first flange 56 in the "reverse" circumferential direction as belt tensioner 20 rotates with belt 20 in a "forward" circumferential direction opposite to the reverse circumferential direction. The movable flange 66 thus "lags behind" fixed flange 56 and tensions belt 22. As this occurs, rotation limiter 34 remains spaced apart from rotation limiter surface 78, as shown in FIGS. 10 and 11.

Figure 13:
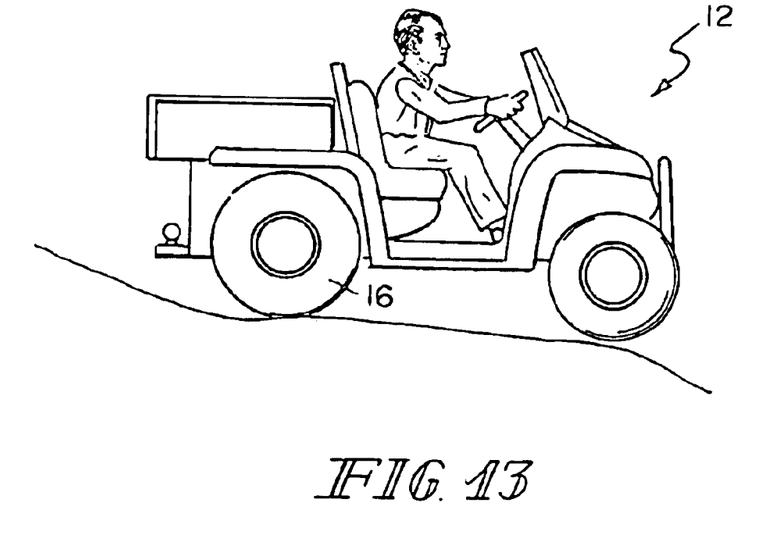
FIG. 13 is an elevation view showing the vehicle landing after having gone airborne.
Figure 15:
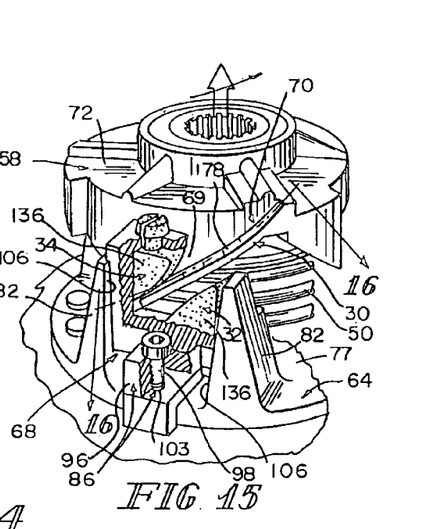
FIG. 15 is a perspective view, with portions broken away, that corresponds to the vehicle landing situation of FIG. 14 and shows the cam now spaced apart from the cam follower and impacting the rotation limiter.

Referring now to FIGS. 12–16, there may be times when vehicle 12 goes airborne (see FIG. 12) and then lands on the ground (see FIG. 13). The impact of the landing may suddenly increase the rotational rate of wheel 16 and fixed unit 46 coupled thereto so that fixed unit 46 rotates ahead of movable unit 48 in the forward circumferential direction. When this occurs, cam 30 rotates relative to engagement unit 68 so that rotation limiter surface 78 impacts rotation limiter 34, as shown in FIGS. 15 and 16. The rotation limiter 34 thus blocks fixed unit 46 from rotating further ahead of movable unit 48. To do so, rotation limiter 34 is positioned ahead of cam follower 32 in the forward circumferential direction within 180 of cam follower 32 and is positioned ahead of cam 30 in the forward circumferential direction within 180 of cam 30. The fixed and movable units 46, 48 then readjust so that cam 30 becomes spaced apart from rotation limiter 34 and re-engages cam follower 32.

What is claimed is:

1. A belt tensioner for use with a torque converter to adjust the overall speed of a vehicle including a wheel and an output shaft coupled to the wheel, the belt tensioner comprising
   a motion transmitting fixed unit configured to be fixed to the output shaft for movement therewith, the fixed unit including a first flange, and a cam, and
   a belt tensioning movable unit configured to move relative to the fixed unit, the movable unit including a second flange, an axially extending mount, a cam follower, and a rotation limiter, the cam follower and the rotation limiter being coupled to the axially extending mount,
   wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, and the cam extends between the cam follower and the rotation limiter.

2. The belt tensioner of claim 1, wherein the fixed unit includes an axially extending cam mount, and the cam extends radially outwardly from the axially extending cam mount.

3. The belt tensioner of claim 2, wherein the cam mount includes an edge portion and the cam extends radially outwardly from the edge portion.

4. The belt tensioner of claim 1, wherein the cam includes a cam follower surface and a rotation limiter surface, the cam follower is configured to engage the cam follower surface, the rotation limiter is configured to engage the rotation limiter surface, and the cam follower surface and the rotation limiter surface face in axially opposite directions.

5. The belt tensioner of claim 1, wherein the movable unit includes a hub coupled to the second flange, and the axially extending mount is coupled to the hub for removal therefrom.

6. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, an axially extending mount, a cam follower, and a rotation limiter, the cam follower and the rotation limiter being coupled to the axially extending mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, and the cam extends between the cam follower and the rotation limiter, wherein the cam includes a cam follower surface and a rotation limiter surface, the cam follower is configured to engage the cam follower surface, the rotation limiter is configured to engage the rotation limiter surface, and the cam follower surface and the rotation limiter surface face in axially opposite directions, and wherein the cam follower surface and the rotation limiter surface are parallel to one another.

7. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, an axially extending mount, a cam follower, and a rotation limiter, the cam follower and the rotation limiter being coupled to the axially extending mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, and the cam extends between the cam follower and the rotation limiter and wherein the cam includes a cam follower surface and a rotation limiter surface, the cam follower is configured to engage the cam follower surface, the rotation limiter is configured to engage the rotation limiter surface, and the cam follower surface and the rotation limiter surface are parallel to one another.

8. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, an axially extending mount, a cam follower, and a rotation limiter, the cam follower and the rotation limiter being coupled to the axially extending mount, wherein the first flange and the second flange cooperate to provide a space therebetween to receive a belt of the torque converter for transmission of motion between the belt and the output shaft, the cam follower is configured to follow the cam for rotation of the second flange relative to the first flange in a first circumferential direction which allows tension on the belt upon relative axial movement between the first flange and the second flange away from one another, the rotation limiter is configured to engage the cam to limit relative rotation between the cam and the cam follower away from one another, the rotation limiter is positioned ahead of the cam follower in a second circumferential direction opposite to the first circumferential direction within 180° of the cam follower.

9. The belt tensioner of claim 8, wherein the cam extends between the cam follower and the rotation limiter.

10. The belt tensioner of claim 8, wherein each of the cam follower and the rotation limiter includes an engagement surface configured to engage the cam, and the engagement surfaces face one another.

11. The belt tensioner of claim 10, wherein the engagement surfaces face in axially opposite directions.

12. The belt tensioner of claim 8, wherein the rotation limiter is position ahead of the cam in the second direction within 180° of the cam.

13. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, a hub through which the output shaft is to extend, a mount coupled to the hub, a cam follower coupled to the mount, and a rotation limiter coupled to the mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, the mount being removable from the hub.

14. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, a hub through which the output shaft is to extend, a mount coupled to the hub, a cam follower coupled to the mount, and a rotation limiter coupled to the mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, the mount being removable from the hub, and wherein the hub includes an annular base and a pair of spaced-apart posts extending axially from the base and the mount is coupled to the base for removal therefrom and is positioned between and engages the posts.

15. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, a hub through which the output shaft is to extend, a mount coupled to the hub, a cam follower coupled to the mount, and a rotation limiter coupled to the mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, the mount being removable from the hub, and wherein the mount includes a fastener and a block formed to include a fastener-receiving channel and the fastener extends through the fastener-receiving channel into engagement with the hub and is removable from the hub.

16. A belt tensioner for use with a torque converter to adjust the overall speed of a vehicle including a wheel and an output shaft coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, a hub through which the output shaft is to extend, a mount coupled to the hub, a cam follower coupled to the mount, and a rotation limiter coupled to the mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange to tension the belt upon relative axial movement between the first flange and the second flange away from one another, the rotation limiter is configured to engage the cam to limit relative rotation between the cam and the cam follower away from one another, the mount being removable from the hub, and wherein the mount includes a support wall positioned radially outwardly from the cam, a cam follower retainer coupled to a radially inner surface of the support wall, and a rotation limiter retainer coupled to the radially inner surface of the support wall, the cam follower is coupled to the cain follower retainer, and the rotation limiter is coupled to the rotation limiter retainer.

17. The belt tensioner of claim 16, wherein each of the cam follower retainer and the rotation limiter retainer includes a ramp coupled to the radially inner surface of the support wall, each ramp includes an inclined surface that is inclined relative to the radially inner surface of the support wall, the cam follower engages the inclined surface of the ramp of the cam follower retainer, and the rotation limiter engages the inclined surface of the ramp of the rotation limiter retainer.

18. The belt tensioner of claim 17, wherein each of the cam follower retainer and the rotation limiter retainer includes an L-shaped wall, the L-shaped wall of the cam follower retainer extends radially inwardly from the ramp of the cam follower retainer and engages the cam follower, and the L-shaped wall of the rotation limiter retainer extends radially inwardly from the ramp of the rotation limiter retainer and engages the rotation limiter.

19. A belt tensioner for use with a torque converter to adjust the overall speed of a vehicle including a wheel and an output shall coupled to the wheel, the belt tensioner comprising a motion transmitting fixed unit configured to be fixed to the output shaft for movement therewith, the fixed unit including a first flange and a cam, and a belt tensioning movable unit configured to move relative to the fixed unit, the movable unit including a second flange, a hub through which the output shaft is to extend, a mount coupled to the hub, a cam follower coupled to the mount, and a rotation limiter coupled to the mount, wherein the first flange and the second flange cooperate to provide a space therebetween to receive a belt of the torque converter for transmission of motion between the belt and the output shaft, the cam follower is configured to follow the cam to provide relative rotation between the first flange and the second flange which allows tension on the belt upon relative axial movement between the first flange and the second flange away from one another, the rotation limiter is configured to engage the cam to limit relative rotation between the cam and the cam follower away from one another, the mount being removable from the hub, and wherein the mount is formed to include a channel, at least one of the cam follower and the rotation limiter includes a body configured to engage the cam and a pair of flexible members cantilevered to the body, and the members extend through the channel and engage the mount to couple the body to the mount.

20. The belt tensioner of claim 19, wherein the members cooperate to provide a slot therebetween to allow the members to move toward one another during insertion of the members through the channel, each flexible member includes a proximal end portion coupled to the body and a tapered distal end portion that engages the mount and cooperates with the proximal end portion to provide a groove therebetween.

* * * * *